United States Patent [19]
Perona

[11] Patent Number: 5,663,848
[45] Date of Patent: Sep. 2, 1997

[54] CLIP FOR ATTACHING TAPE DRIVE MOTOR TO CHASSIS

[75] Inventor: Mark W. Perona, San Diego, Calif.

[73] Assignee: Iomega Corporation, Roy, Utah

[21] Appl. No.: 543,128

[22] Filed: Oct. 13, 1995

Related U.S. Application Data

[63] Continuation-in-part of Ser. No. 531,635, Sep. 21, 1995.
[51] Int. Cl.⁶ .......................... G11B 15/00; G11B 5/008
[52] U.S. Cl. .................. 360/96.1; 360/96.3; 360/83; 360/90
[58] Field of Search ................. 360/83, 84, 85, 360/90, 91, 92, 93, 95, 96.1, 96.2, 96.3, 96.4, 96.5; 310/42, 71, 91; 24/293, 297; 248/222.11, 222.12, 603, 604, 674

[56] References Cited

U.S. PATENT DOCUMENTS

| | | | |
|---|---|---|---|
| 3,154,281 | 10/1964 | Frank | 248/222.12 |
| 4,476,504 | 10/1984 | Georges | 360/96.5 |
| 4,677,508 | 6/1987 | Barton, Jr. et al. | 360/96.5 |
| 4,809,101 | 2/1989 | Tanaka et al. | 360/96.3 |
| 4,866,552 | 9/1989 | Nagase | 360/96.5 |
| 5,065,264 | 11/1991 | Ohmori et al. | 360/96.5 |
| 5,067,034 | 11/1991 | Kido | 360/96.3 |
| 5,069,415 | 12/1991 | Mechalas | 248/604 |
| 5,210,664 | 5/1993 | Perona | 360/93 |
| 5,267,125 | 11/1993 | Liu | 24/293 |
| 5,272,579 | 12/1993 | Ohkubo et al. | 360/96.5 |
| 5,290,005 | 3/1994 | Akiyama et al. | 248/222.12 |
| 5,452,184 | 9/1995 | Scholder et al. | 24/297 |
| 5,537,275 | 7/1996 | Peace et al. | 360/109 |

FOREIGN PATENT DOCUMENTS 59-167871  9/1984  Japan.

*Primary Examiner*—Stuart S. Levy
*Assistant Examiner*—David L. Ometz
*Attorney, Agent, or Firm*—Woodcock Washburn Kurtz Mackiewicz & Norris LLP

[57] ABSTRACT

A magnetic tape drive for reading/writing data on magnetic tape in a cartridge of the type in which a driven roller in the cartridge moves tape past a read/write head in the drive has a spring clip which holds the motor plate of the tape drive motor on the chassis. The spring clip is secured on the chassis with a snap-on interference fit. The spring clip bears against the motor and also provides an electrical ground connection from chassis ground to the circuit board.

3 Claims, 6 Drawing Sheets

5,663,848

CLIP FOR ATTACHING TAPE DRIVE MOTOR TO CHASSIS

RELATED APPLICATIONS

This application is a continuation-in-part of copending U.S. application Ser. No. 08/531,635 filed Sep. 21, 1995 entitled "Clip for Attaching Tape Drive Motor to Chassis" by Mark W. Perona.

This application is related to applications HEAT DIFFUSER FOR MAGNETIC TAPE DRIVE, Perona, Ser. No. 08/543,127, filed Oct. 13, 1995; SNAP-IN CHASSIS FOR TAPE DRIVE, Perona, Ser. No. 08/543,133, filed Oct. 13, 1995 and OPENING LEVER FOR MAGNETIC TAPE CARTRIDGE DOOR, Perona, Ser. No. 08/543,134, filed Oct. 13, 1995, which are incorporated herein by reference.

BACKGROUND OF THE INVENTION

This invention relates to a magnetic tape drive and more particularly, to a clip for securing a motor to the chassis of a tape drive.

U.S. Pat. No. 5,210,664-Perona shows a tape drive for use with so-called "Mini-Data" cartridges. There are standards for these drives so that drives manufactured by different companies can read and write data interchangeably. These standards are referred to as the "QIC" (Quarter-Inch Cartridges) standards. One set of standards is referred to as the "QIC-80 Standards for 250–800 megabyte products." The QIC standards specify the pressure of engagement between the driven roller in the cartridge and the drive roller in the drive. The pressure between the driven roller (wheel) in the cartridge and the drive roller (wheel) in the tape drive which is providing the drive must be at a certain level.

Recently, a new wide tape cartridge referred to as "TRAVAN" has been announced for use with such drives. In such drives it is necessary to provide an electrical grounding connection between the tape drive motor and the printed circuit board which controls the operation of the drive.

It is an object of the present invention to simplify the mounting of the motor on the chassis and to provide a good ground connection between the motor and the printed circuit board.

SUMMARY OF THE INVENTION

A magnetic tape drive for reading/writing data on magnetic tape in a cartridge of the type in which a driven roller in the cartridge moves tape past a read/write head in the drive has a spring clip which mounts the motor on the chassis and provides a ground connection from the motor to the circuit board. The spring clip is snapped onto the chassis in an interference fit. It has tabs which fit over ears on the motor plate to lock them into retainer grooves on the chassis. The tabs on the motor plate are on opposite sides of the drive shaft of the motor. The clip has a third tab locking the motor plate to the chassis at the rear of the motor. The third tab is resilient to movement of the motor against the direction of insertion of the cartridge. This third tab provides the necessary load force between the drive roller on the motor and the driven roller in the cartridge. The third tab also provides an electrical connection for grounding the motor to the circuit board.

DESCRIPTION OF THE PREFERRED EMBODIMENT

Figure 3:
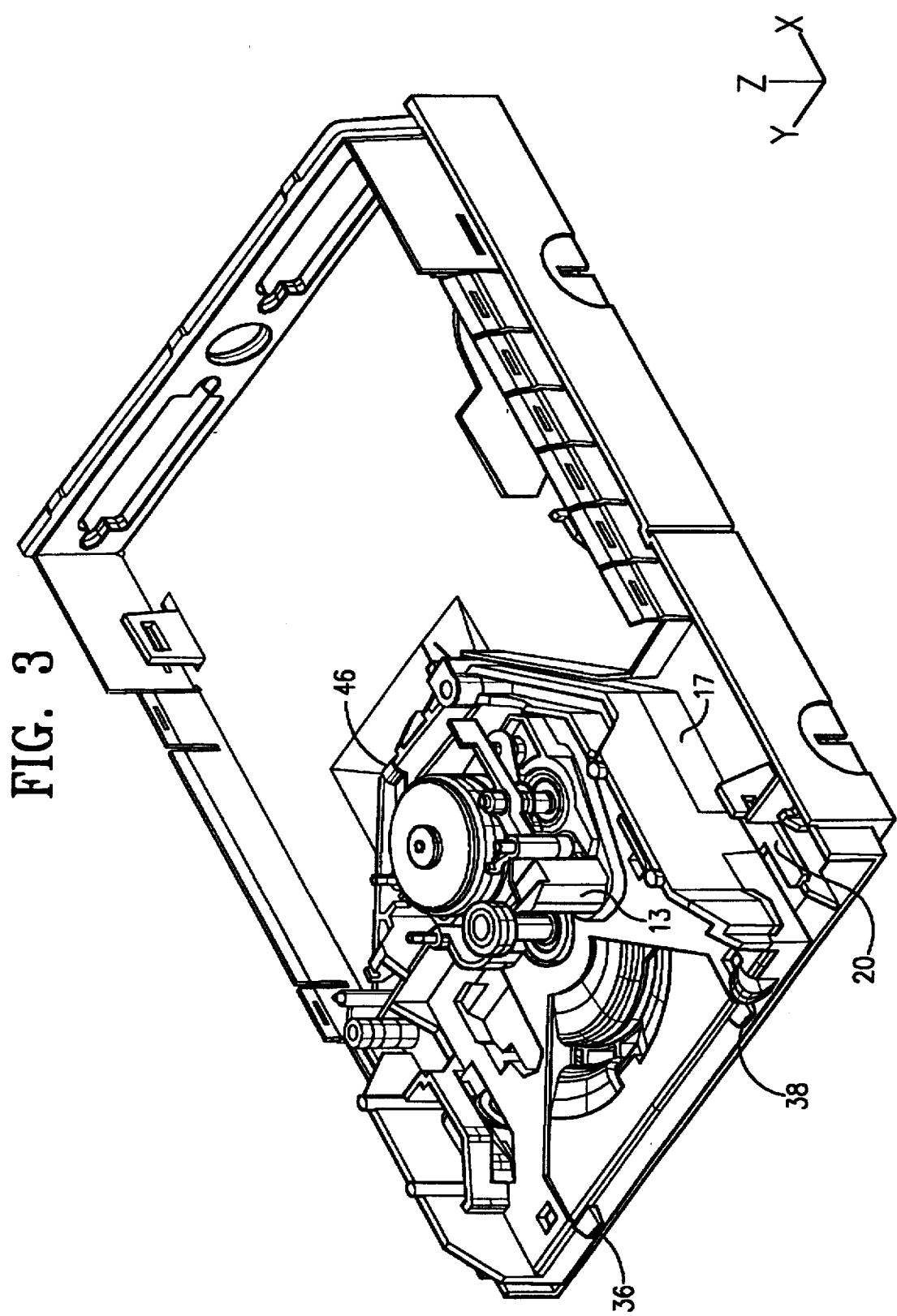
FIG. 3 is a perspective view partially broken away.

Tape drives of this type are for use with cartridges 10 having a metal baseplate 10a. The drive includes a drive roller 11 which engages a driven roller (not shown) in the cartridge to move magnetic tape in the cartridge. The tape is read by a magnetic head 13 (FIG. 3) in the drive.

Figure 5:
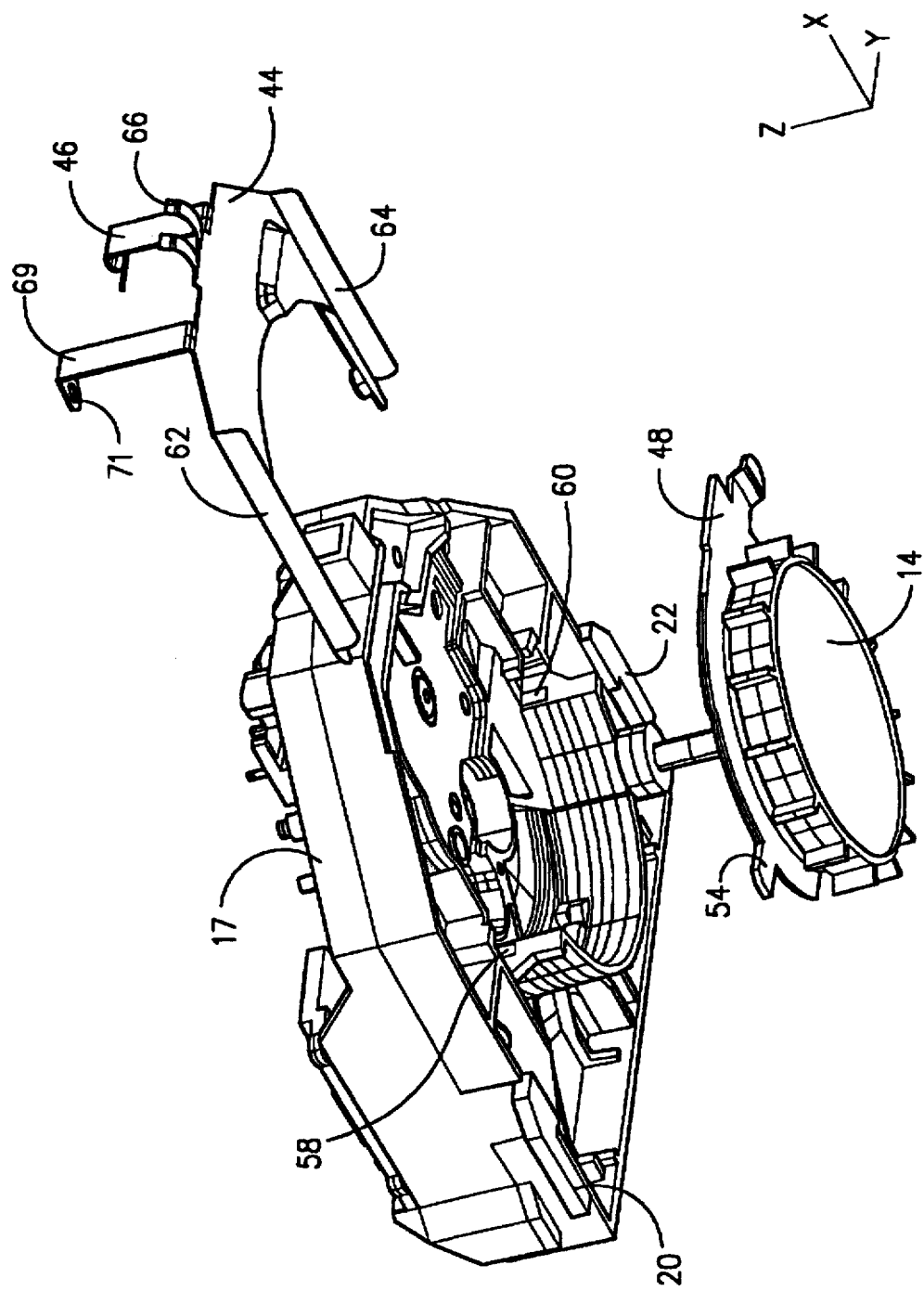
FIG. 5 is a perspective, exploded view of the bottom of the chassis.

Motor 14 (FIG. 5) is mounted beneath the one-piece molded chassis 17. The one-piece molded chassis 17 has a three point interference fit suspending it in the pan 19. Pan 19 mounts the tape drive in relation to other components. For example, these tape drives are often used in conjunction with personal computers and other peripherals which are mounted in a rack. Molded plastic pan 19 and its case are mounted in this rack.

The chassis 17 has three horizontal planar mounting members including member 20. These snap into slots 25–27 in upstanding mounting members 28–30 on the pan. Planar mounting members 20 and 22 on the chassis fit into slots in the upstanding mounting members in the pan with an interference fit. The planar mounting member 24 fits in slot 27 with a looser fit.

Figure 1:
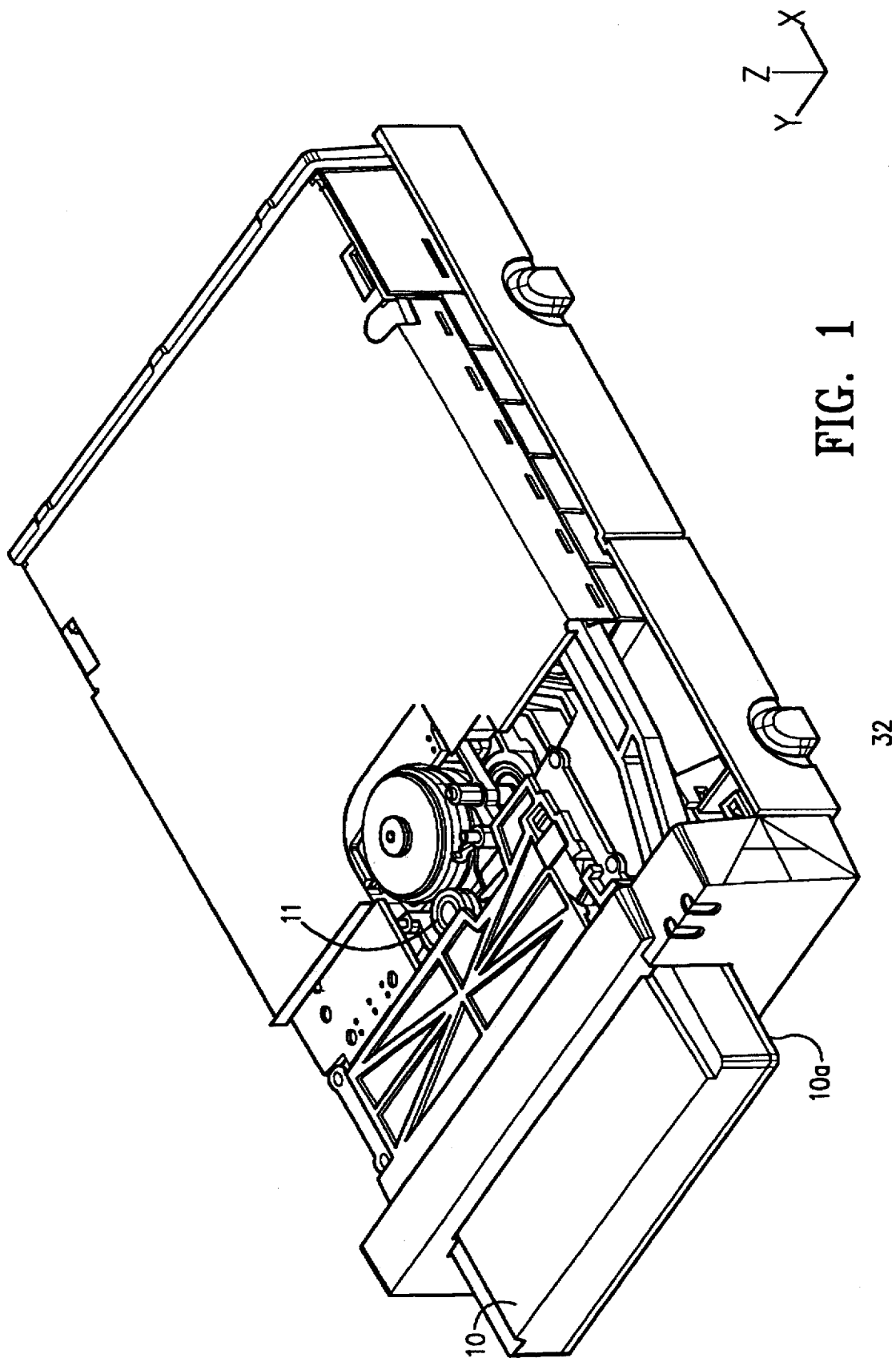
FIG. 1 is a perspective view of the tape drive of the present invention with a cartridge.
Figure 2:
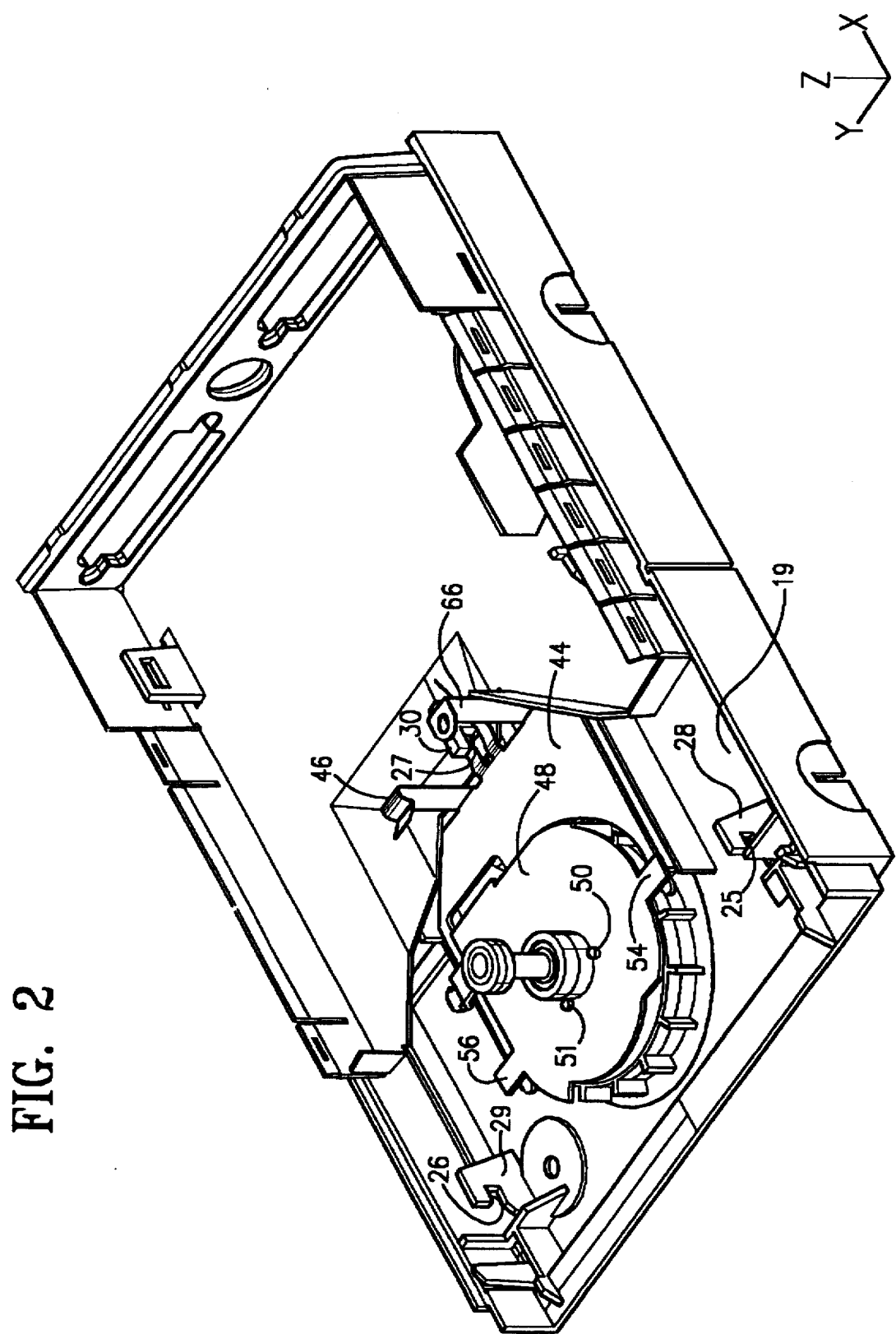
FIG. 2 is a perspective view partially broken away.
Figure 4:
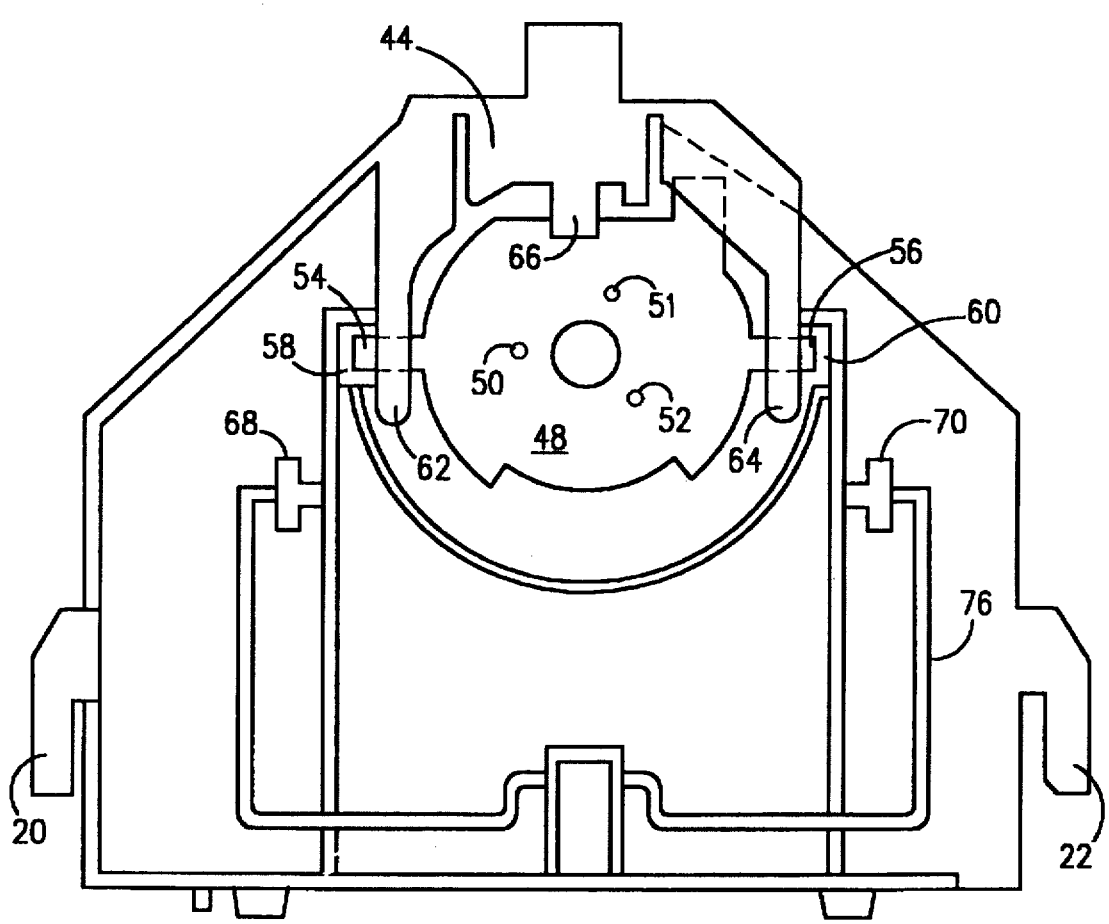
FIG. 4 is a bottom view of the chassis.
Figure 6:
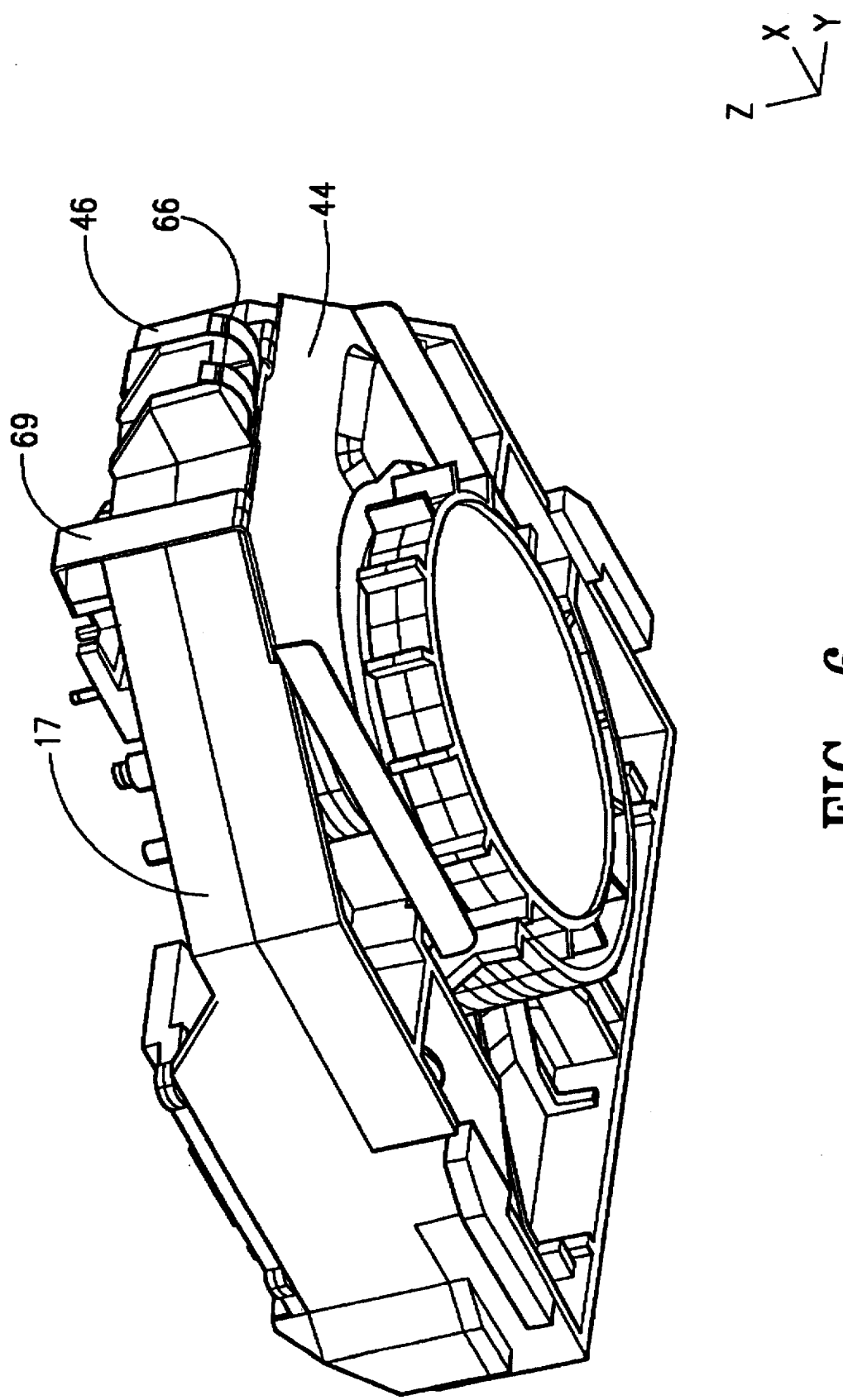
FIG. 6 is a perspective view of the bottom of the chassis.

In accordance with the invention, a spring clip 44 (FIGS. 5 and 6) has a locking tab 46 which clips over the rear of the chassis. The motor 14 has a motor plate 48 which is secured to the motor by screws inserted through three holes, including 50, 51 (FIG. 2), in the motor plate. The motor plate has ears 54 and 56 which are placed in retainer holes 58 and 60 in the chassis (FIG. 4). Retainer holes 58 and 60 are at mating positions with ears 54 and 56 on the chassis.

Then, the spring clip 44 is inserted over the motor plate. (In the bottom views of FIGS. 5 and 6, the clip is inserted under the motor plate.) Clip 44 has tabs 62 and 64 which are inserted over the ears 54 and 56 to lock them into the retainer holes in the chassis. After the spring clip is inserted, the ears are held in the slots by the tabs 62 and 64 on the spring clip. The two tabs 62 and 64 are disposed on opposite sides of the drive shaft of the motor.

The spring clip has a tab 66 for engaging the rear of the motor. This tab is resilient to movement of the motor against the direction of insertion of the cartridge. The tab 66 provides a bias against the motor. This provides the necessary load force between the drive roller on the motor and the driven roller in the cartridge.

Rollers 68 and 70 engage slots on the cartridge to lock the cartridge in the drive. These rollers are held in place by a torsion spring 76.

Further in accordance with the invention, another tab 69 provides an electrical connection to the chassis 17. Tab 69 has a hole 71 for making an electrical connection to the circuit board. This is used to complete a ground connection between clip 44 and the circuit board.

Various modifications may be made to the preferred embodiment. The appended claims are, therefore, intended to cover all such modifications within the true spirit and scope of the invention.

What is claimed is:

1. A magnetic tape drive for reading/writing data on magnetic tape in a cartridge of the type in which a driven roller in said cartridge moves tape past a read/write head in said drive, said drive comprising:

a motor having a drive shaft with means for moving said tape;

a chassis on which said motor is mounted;

a motor plate attached to said motor, said motor plate having ears;

retainer means on said chassis, said retainer means being holes in said chassis for securing said plate to said chassis; and a spring clip having an interference fit with said chassis, said clip including tabs, said clip being secured on said chassis with said interference fit, said tabs being inserted over said ears to lock said motor plate into said holes.

2. The magnetic tape drive recited in claim 1 wherein said clip has two of said tabs disposed on opposite sides of said drive shaft of said motor and wherein said holes are on said opposite sides of said drive shaft to mate with said two tabs.

3. The magnetic tape drive recited in claim 1 further comprising:

a circuit board for said drive and wherein said clip further comprises:

means providing an electrical connection between said clip and said circuit board.

* * * * *